Jan. 22, 1957  J. W. BRUNDAGE  2,778,060
TIRE CURING PRESS
Filed May 12, 1953  4 Sheets-Sheet 1

INVENTOR.
JAMES W. BRUNDAGE
BY
Oberlin & Limbach
ATTORNEYS.

Jan. 22, 1957  J. W. BRUNDAGE  2,778,060
TIRE CURING PRESS
Filed May 12, 1953  4 Sheets-Sheet 3

INVENTOR.
JAMES W. BRUNDAGE
BY
Oberlin & Limbach
ATTORNEYS.

INVENTOR.
JAMES W. BRUNDAGE
BY
Oberlin & Limbach
ATTORNEYS.

United States Patent Office 2,778,060
Patented Jan. 22, 1957

2,778,060

TIRE CURING PRESS

James W. Brundage, Akron, Ohio, assignor to National Rubber Machinery Company, Akron, Ohio, a corporation of Ohio Application May 12, 1953, Serial No. 354,451

9 Claims. (Cl. 18—17)

The present invention, while generally indicated as relating to a tire curing press, is more particularly concerned with a tire stripping or ejecting mechanism for such press.

In the shaping and curing of truck tires and like heavy-duty and large size tires of sizes such as 7.00 x 20, 7.50 x 20, 8.25 x 20, 10.00 x 20, 11.00 x 20, and 12.00 x 20, for example, difficulty is sometimes encountered in the removal of such tires from one or the other of the mold sections of the press because the inner surfaces of the dual beads are relatively long and are substantially cylindrical, and thus tend to stick around the corresponding cylindrical toe or bead rings of the mold; whereas in the case of passenger car tires, the inner surfaces of the beads are usually relatively short and tapered, and thus readily removable from the tapered toe rings. However, it is to be understood that this invention may nevertheless be employed in connection with any tire whether the inner surfaces of the beads be tapered or cylindrical.

It is one general object of this invention to provide a tire stripper or ejector which, in one position thereof with respect to the mold, preferably constitutes the bead molding surface of the mold and which, in a different position, has such bead molding surface retracted relative to the remaining molding surfaces of the mold.

Another object of this invention is to provide a tire stripping or ejecting mechanism of the character indicated above which, in a yet different position is operative to strip the tire from such remaining molding surface whereby, when said mechanism is retracted, all of the molding surfaces have been stripped or loosened with respect to the surface of the tire formed thereagainst.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, or but a few of the various ways in which the principle of the invention may be employed.

Figure 5:
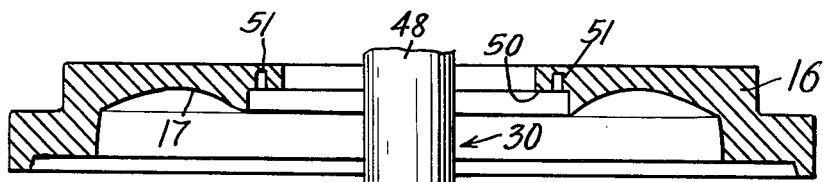
Figure 6:
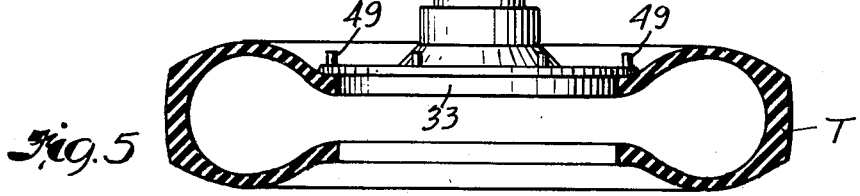

Fig. 5 is a fragmentary cross-section view illustrating the ejector or stripping mechanism in the position stripping the cured tire from the mold section; and Fig. 6 shows the ejector or stripping mechanism in its retracted position operative to strip the cured tire therefrom so that the latter will be completely freed from the press and adapted to be caught as, for example, on a platform inserted between the top and bottom mold sections.

Figure 1:
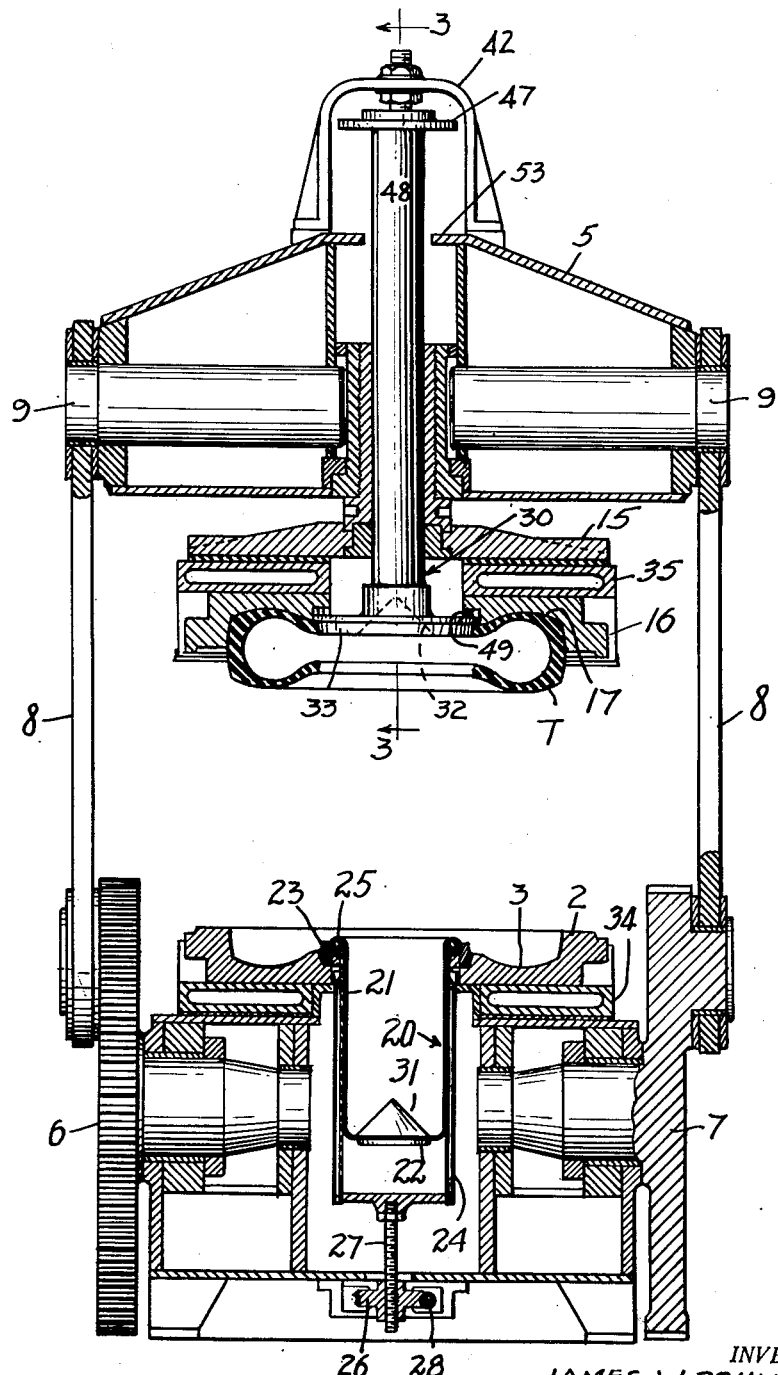
Fig. 1 is a central vertical cross-section view of a tire curing press embodying the present improvements in tire stripping or ejecting mechanism, the mechanism being shown in its normal operating position constituting a portion of the molding surface of one of the mold sections.
Figure 2:
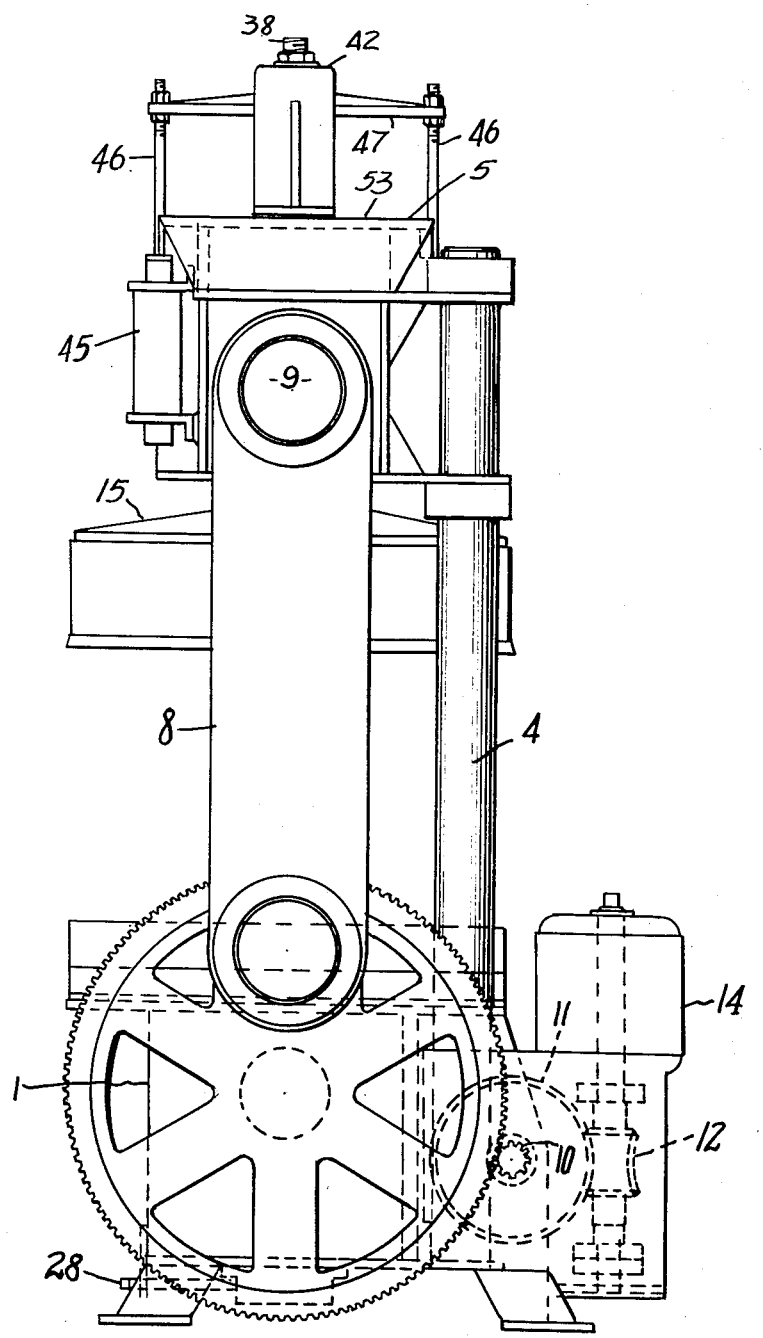
Fig. 2 is a side elevation view of the tire curing press as viewed from the right-hand side of Fig. 1.

Referring now more particularly to the drawings and first to the tire curing press as a whole as shown in Figs. 1 and 2, the press comprises a base 1 on which is mounted a bottom mold section 2 whose molding surface 3 faces upwardly. Said base 1 has projecting upwardly therefrom a desired number of columns 4 or the like on which the upper press head 5 is reciprocable as by means of cranks 6 and 7 journalled on said base 1 and crank arms 8 pivotally connected to said cranks and to trunnions 9 of said upper press head 5. One of the cranks, herein the crank 7, is a bull gear crank adapted to be driven as by means of the drive pinion 10 of worm wheel 11, the latter of which in turn is driven by a worm shaft 12 of a drive motor 14. The mold supporting member 15 to which the top mold section 16 is secured is threadedly engaged in said upper press head 5 so that, depending upon the thicknesses of the mold sections 2 and 16, they may be brought together into mating engagement upon 180° rotation of the cranks 6 and 7; and, obviously, during the curing operation, suitable control means will be provided to cause the mold sections 2 and 16 to be retained in mating engagement, and thereafter the power drive means may cause rotation of the cranks 180° in the same direction or in the opposite direction, as desired. The top mold section 16 has a downwardly facing molding surface 17; and when the mold sections 2 and 16 are in mating engagement, the molding surfaces 3 and 17 define a cavity of tire shape including bead molding portions, side wall molding portions, and skid character or tread molding portions.

In the illustrated embodiment of the invention, the tire shaping member 20 comprises a diaphragm 21 which has a closed end 22 and an open end clamped around the inner periphery of the bottom mold section 2. In this case, the bead toe ring 23 bolted around the inner periphery of the bottom mold section 2 has a seat complementary with the beaded edge of said diaphragm 21 and a clamping member 24 is drawn down to clamp the beaded edge of the diaphragm 21 between the flange 25 of said member and the seat of said toe ring 23, such clamping being effected as by rotating the nut 26 which is held against axial movement in the base 1 and which has threaded engagement with a stud 27 projecting from the bottom of said clamping member. Said nut 26 may be in the form of a worm wheel rotated as by means of a worm shaft 28 which is journalled in the base 1 of the press. As evident, when the nut 26 is rotated in one direction, the clamping member 24 will be moved upwardly, thereupon the diaphragm 21 may be unbuttoned therefrom, and a new diaphragm 21 may be buttoned thereover so that, when the nut 26 is rotated in the opposite direction, the clamping member 24 will be pulled downwardly to clamp the beaded edge of the new diaphragm 21 between the flange 25 of said clamping member and the seat of said toe ring 23.

With the press in open position and the diaphragm 21 disposed inside said member 24 as shown in Fig. 1, an uncured tire carcass in pulley band form may be seated around said bottom toe ring 23, whereupon fluid under pressure may be admitted between the closed ends of said diaphragm 21 and said clamping member 24. This causes the diaphragm 21 to be inverted and thereby telescoped within the uncured tire carcass. Then, as the upper press head 5 is moved downwardly, the top bead ring assembly 30 will center the diaphragm 21 by reason of the interfitting of the conical projection 31 of the diaphragm and the conical recess 32 in said assembly; and, of course, the top toe ring 33 disposed around the inner periphery of the top mold section 16 will engage the upper edge of the uncured tire carcass.

As the press continues to close, fluid under pressure, for example steam or hot water, within the diaphragm will cause a swelling of the diaphragm 21 and corresponding swelling of the uncured tire carcass. As the bead portions of the carcass are moved progressively closer, the carcass will gradually assume the shape of the mold cavity as the mold sections finally come together into mating engagement. The tire T thus shaped and held in engagement with the molding surfaces 3 and 17 will be cured or vulcanized by heating of the molds by the platens 34 and 35 and by circulating curing medium, for example, hot water or steam, through the diaphragm 21.

In the employment of this type of press, the molding surfaces of bottom mold section 2 and toe ring 23 will be preferentially treated with a suitable anti-sticking compound so that, when the press is opened, the cured tire T will be pulled out of the bottom mold section 2 and will stick in the top mold section 16. The diaphragm 21 may be withdrawn from within the cured tire T by venting the fluid pressure therewithin and by moving the push rod 36 downwardly to push the closed end of the diaphragm 21 down through the beaded edge thereof into the clamping member 24 to the position shown in Fig. 1.

Figure 3:
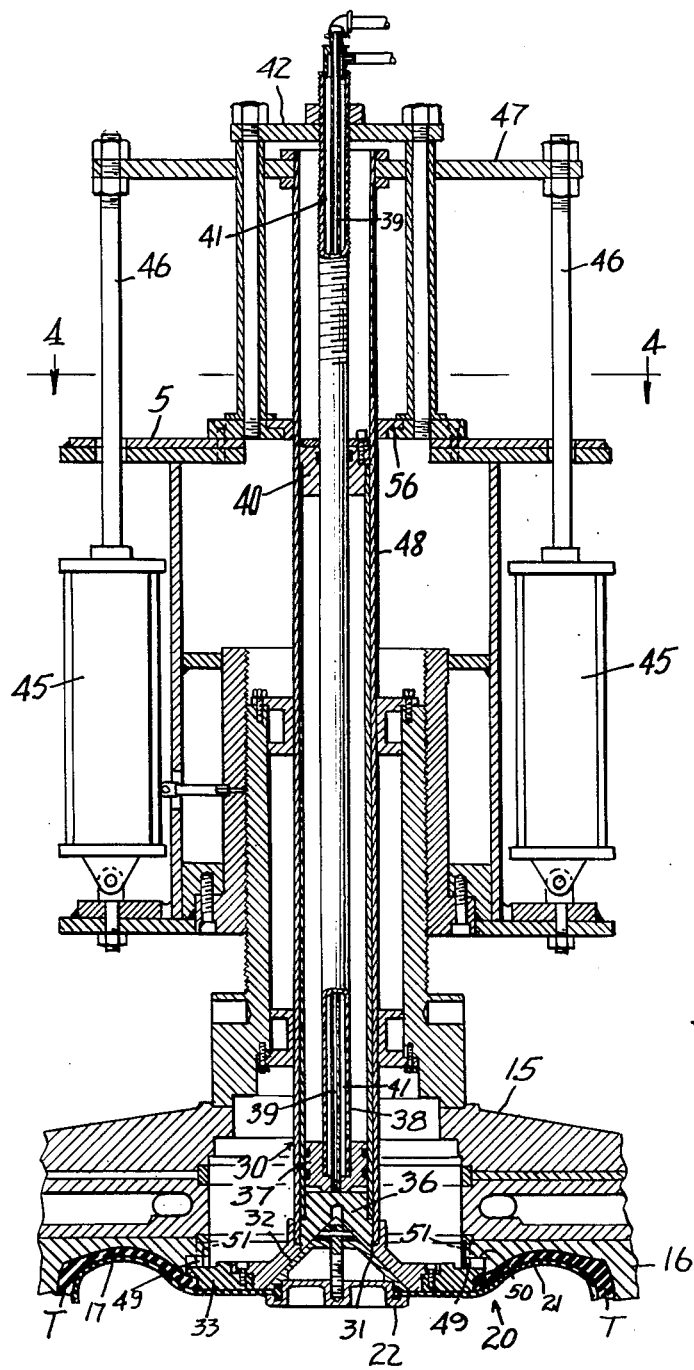
Fig. 3 is a cross-section view on a somewhat enlarged scale taken substantially along the line 3—3, Fig. 1.
Figure 4:
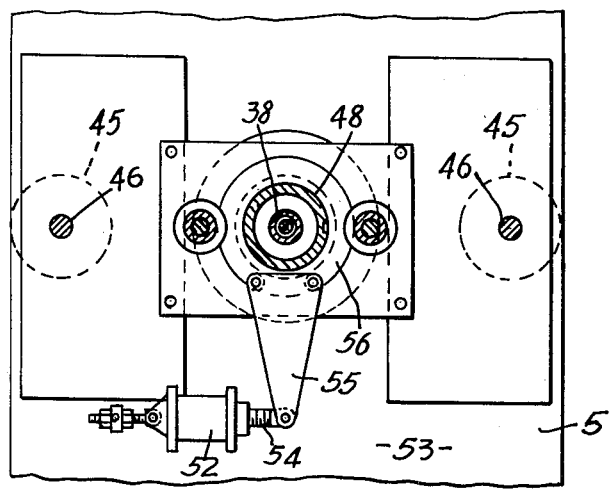
Fig. 4 is a horizontal cross-section view taken substantially along the line 4—4, Fig. 3.

Referring now to Fig. 3, the push rod 36 referred to is in the form of a cylinder having a closed bottom end which is reciprocable with respect to a piston 37 and piston rod 38 by means of fluid under pressure admitted alternately between said piston 37 and the closed end of said cylinder through the passageway 39 in piston rod 38 or between the piston 37 and the packing gland 40 at the other end of said cylinder through the passageway 41 in said piston rod 38. Thus, when it is desired to push down and invert the diaphragm 21 as just described so as to strip the same from within the cured tire T, the passageway 39 will be communicated with a source of fluid under pressure and push rod 36 will be forced downwardly to push the closed end of the diaphragm 21 through the open end into the clamping member 24. Similarly, when it is desired to raise the push rod 36 to its normal operating position, fluid under pressure will be admitted through the other passageway 41 to cause said push rod to be elevated to the position shown in Fig. 3 and also in Fig. 1. The upper end of piston rod 38 is threaded into a plate 42 as shown, so that said piston rod 38 may be adjusted to determine the uppermost position of push rod 36 to receive the conical projection 31.

The ejector or stripping mechanism is herein shown as comprising the toe ring 33 disposed around the inner periphery of the top mold section 16 and held in a position to constitute the bead molding surface portion as by means of cylinders 45 which have their piston rods 46 connected to a cross-member 47, the latter being secured to the upper end of the tubular extension 48 of said ejector mechanism. Said toe ring 33 is provided with upstanding pins 49 which are adapted to engage the bottom of a circular recess 50 around the inner periphery of the top mold section 16. The toe ring 33 is adapted to be rotated relative to the top mold section 16 to align said pins 49 with holes 51 in the bottom wall of such recess as by means of the cylinder 52. Said cylinder 52 is mounted on plate 53 and has its piston rod 54 connected to an arm 55 which projects from ring 56, the latter being rotatable and axially fixed but being slidably keyed to the tubular extension 48.

In the previous discussion of the operation of the press, the cured tire T remained stuck in the top mold section 16, and it will now be apparent that, when the ejector mechanism is moved downwardly with respect to the top mold section, the cured tire T will be stripped from the top mold section as shown, for example, in Fig. 5. Normally, in the case of a passenger car tire or the like wherein the inner surfaces of the beads of the tire are tapered, the cured tire T will drop from the toe ring 33 or can be readily freed therefrom without much effort. However, in the case of truck tires and the like wherein the inner surfaces of the beads are cylindrical as shown, and usually of considerable length in an axial direction because of the two or more wire bundles in such beads, the removal of the cured tire from the toe ring 33 is not such a simple matter. In order to free the cured tire from said toe ring 33, the latter is rotated by cylinder 52 a part-turn with respect to the top mold section so as to align the pins 49 with the holes 51 and then when the toe ring 33 is moved upwardly, the bead molding surfaces thereof will be retracted or withdrawn with respect to the molding surface 17 of the top mold section 16 and also with respect to the bead surfaces of the cured tire T. In this way, the cured tire T is freed from the toe ring 33; and because the cured tire was previously freed from the top mold section 16, the same will now drop free from the top mold section 16 and from the toe ring 33. If desired, a suitable conveyor or platform may be inserted between the top and bottom mold sections 2 and 16 to catch the cured tire T as it drops. Such conveyor or platform is not shown herein; and, obviously, if such conveyor or platform is provided, the same will first have to be withdrawn from the space between the top and bottom mold sections before the next uncured tire carcass is seated on the bottom mold section 2 preparatory to shaping and curing thereof in the manner previously described.

It is to be noted that the cylinder 52 may be actuated at any time after the tire T has been stripped from mold section 16; and, in fact, the ejector mechanism may be raised without turning and pressure maintained in the cylinders 45 so that, as soon as the ejector mechanism has been turned to align the pins 49 with the holes 51, the toe ring 33 will, with some degree of shock, pop upwardly to assure withdrawal of said toe ring 33 from within the bead of the cured tire T. The extent of withdrawal of the toe ring 33 is not critical and in some instances the limit of such withdrawal need be only a fractional portion of the axial extent of the tire bead because once the joint between the toe ring and the inner surface of the bead has been broken or disturbed, the tire T will drop off or can be easily pulled down the rest of the way with respect to the toe ring 33. However, in most instances it will be preferred to completely withdraw the toe ring 33 from within the tire bead so that no manual effort will be required to free the tire.

Although there is shown herein but one arrangement for retracting the stripper or ejector mechanism with respect to the mold section 16, it is to be understood that numerous equivalent arrangements may be substituted, such as, for example, a cam or screw thread arrangement in which the rotation of the ejector mechanism will so permit or effect withdrawal of the toe ring 33 from within the tire bead and with respect to the associated mold section 16. Likewise, although the bottom toe ring 23 is herein fixedly secured with respect to the bottom mold section 2, the same may also be mounted for retraction with respect to the bottom mold section rather than relying upon preliminary application of antisticking compound to the bottom molding surfaces and the molding surfaces of the bottom toe ring. Obviously, if the bottom toe ring is to be so withdrawable or retractable, suitable mechanism may be provided in the base 1 of the press to effect a turning and pulling down of the bottom toe ring down into the bottom mold section and illustration of such mechanism is not deemed necessary for the purposes of the present invention.

In any case, it has been found desirable to have the cured tire T stick in the top mold section 16 to eliminate the necessity of the operator lifting the cured tire after the press opens. Moreover, it is not desired to have the cured tire remain in contact with the hot molding surfaces of the bottom mold section 2 for any length of time after the curing, because this may produce blemishes. As soon as the mold sections 2 and 16 have separated, the ejector mechanism may be actuated downwardly with respect to the top mold section so as to free the tire from the hot molding surfaces of the top mold section in which case the tire will hang as shown in Fig. 5 during the remainder of the opening stroke of the upper press head 5. As a matter of fact, the retraction of the top toe ring 33 with respect to the tire may be effected during the opening of the press rather than waiting until after the press has completely opened.

Those skilled in the art may readily provide suitable controls for effecting operation of the press and its components in any desired sequence and timed relation; and, therefore, no such control elements have been herein illustrated. Thus, switches and timers may be provided where necessary to control the drive motor 14 and to energize solenoid valves or the like to admit and vent fluid under pressure from within the clamping member 24, the ejector mechanism cylinders 45, the turning cylinder 52, and the push rod actuating cylinder. These controls are within the realm of selection by the skilled mechanic and no invention is seen in using any of a variety of familiar forms thereof which may be employed to accomplish desired functions in the proper sequence and in desired timed relation.

Other modes of applying the principle of the invention may be employed, change being made as regards the details described, provided the features stated in any of the following claims, or the equivalent of such, be employed.

I therefore particularly point out and distinctly claim as my invention:

1. In a tire mold, the combination of a mold section provided with molding surfaces corresponding to one side wall and a portion of the tread of a tire adapted to be vulcanized therein, a bead ring having a peripheral surface corresponding to the interior surface of one bead of the tire, said bead ring and mold section being interfitted for relative axial movement in a direction to at least partially withdraw said bead ring relative to said mold section to thereby correspondingly withdraw such peripheral surface from within the tire bead therearound, and means for so relatively moving said mold section and bead ring.

2. In a tire mold, the combination of a mold section provided with molding surfaces corresponding to one side wall and a portion of the tread of a tire adapted to be vulcanized therein, a bead ring having a peripheral surface corresponding to the interior surface of one bead of the tire and a laterally extending shoulder portion to engage one side of such bead and to form a continuation of such side wall molding surface of said mold section, said bead ring and mold section being interfitted for relative axial movement in opposite directions to first protract said bead ring relative to said mold section to thereby free the tire from said molding surfaces by force exerted by said shoulder portion against the tire bead and then to at least partially withdraw said bead ring relative to said mold section to thereby correspondingly withdraw such peripheral surface from within the tire bead therearound, and means for so relatively moving said mold section and bead ring in opposite axial directions.

3. In a tire curing press of the type in which a green tire carcass is vulcanized in complementary mold sections provided with molding surfaces corresponding to the interior surfaces of the beads, the exterior surfaces of the side walls, and the tread portion of the finished tire, one of said mold sections having a bead ring mounted for axial movement therein, said bead ring having a peripheral surface corresponding to the interior surface of one bead of the tire, and means for moving said bead ring with respect to said one mold section in a direction to at least partially axially withdraw the peripheral surface of said bead ring relative to the molding surfaces of said one mold section to thereby correspondingly withdraw such peripheral surface from within the tire bead therearound.

4. In a tire curing press of the type in which a green tire carcass is vulcanized in complementary mold sections provided with molding surfaces corresponding to the interior surfaces of the beads, the exterior surfaces of the side walls, and the tread portion of the finished tire, one of said mold sections having a bead ring mounted for axial movement therein, said bead ring having a peripheral surface corresponding to the interior surface of one bead of the tire and a laterally extending shoulder forming a continuation of the side wall molding surface of said one mold section, and means for moving said bead ring with respect to said one mold section in a direction to first protract said bead ring relative to said one mold section to thereby force the tire out of engagement with the side wall and tread molding surfaces of said one mold section through pressure exerted by said shoulder of said bead ring on the tire, and then in an opposite direction to at least partially withdraw said bead ring relative to said one mold section to thereby correspondingly withdraw such peripheral surface from within the tire bead therearound.

5. In a tire curing press of the type in which a green tire carcass is vulcanized in complementary mold sections provided with molding surfaces corresponding to the interior surfaces of the beads, the exterior surfaces of the side walls, and the tread portion of the finished tire, one of said mold sections having a bead ring mounted for rotation and axial movement therein, said bead ring having a peripheral surface corresponding to the interior surface of one bead of the tire, said bead ring and said one mold section having surfaces which abut in one relative rotary position of said one mold section and said bead ring to locate the latter in operative tire vulcanizing position and which are circumferentially offset in a different relative rotary position to permit said bead ring to be axially displaced to at least a partially withdrawn position relative to said one mold section to strip the tire bead therefrom, means for relatively rotating said bead ring and said one mold section between such rotary positions, and means for axially displacing said bead ring relative to said one mold section when such surfaces are circumferentially offset.

6. In a tire curing press of the type in which a green tire carcass is vulcanized in complementary mold sections provided with molding surfaces corresponding to the interior surfaces of the beads, the exterior surfaces of the side walls, and the tread portion of the finished tire, one of said mold sections having a bead ring mounted for rotation and axial movement therein, said bead ring having a peripheral surface corresponding to the interior surface of one bead of the tire, and a laterally extending shoulder forming a continuation of the side wall molding surface of said one mold section, means for moving said bead ring axially with respect to said one mold section in a direction to first protract said bead ring relative to said one mold section to thereby force the tire out of engagement with the side wall and tread molding surfaces of said one mold section through pressure exerted by said shoulder of said bead ring on the tire, and then in an opposite direction to at least partially withdraw said bead ring relative to said one mold section to thereby correspondingly withdraw such peripheral surface from within the tire bead therearound, said bead ring and said one mold section having opposed surfaces which abut in one relative rotary position of said one mold section and said bead ring to locate the latter in operative tire vulcanizing position and which are circumferentially offset in a different relative rotary position to permit said bead ring to be axially displaced to the aforesaid withdrawn position to strip the tire bead therefrom, and means for so relatively rotating said bead ring and said one mold section between the aforesaid positions.

7. The combination with one of the mold sections of a vulcanizer for pneumatic tire carcasses, said mold section having a matrix for forming part of the wall of the cavity within which the tire is vulcanized, of a bead ring axially movably supported within said mold so that in its normal position a portion thereof constitutes the tire bead engaging surface of said cavity, and means for moving said bead ring, axially with respect to said mold section, to a position at which its bead engaging surface is at least partially withdrawn from said cavity.

8. The combination with one of the mold sections of a vulcanizer for pneumatic tire carcasses, said mold section having a matrix for forming part of the wall of the cavity within which the tire is vulcanized, of a bead ring axially movably supported within said mold so that in its normal position a portion thereof constitutes the tire bead engaging surface of said cavity, and means for moving said bead ring, axially with respect to said mold section, to positions on opposite sides respectively of said normal position.

9. In a tire mold the combination of a mold section provided with molding surfaces corresponding to the outer surface of a tire adapted to be vulcanized therein, a tire-ejecting portion of said mold section having a molding surface and being interfitted for axial movement relative to adjacent portions of said mold section in a direction to at least partially withdraw the molding surface of said tire-ejecting portion from the molding surfaces of such adjacent portions, and means for so relatively moving said tire-ejecting portion.

References Cited in the file of this patent

UNITED STATES PATENTS

| | | |
|---|---|---|
| 1,786,291 | Denmire | Dec. 23, 1930 |
| 1,925,995 | De Mattia | Sept. 5, 1933 |
| 2,291,506 | Shook et al. | July 28, 1942 |